United States Patent [19]
Deve

[11] 3,881,595
[45] May 6, 1975

[54] CONVEYOR SYSTEM FOR THE INTERMITTENT FORWARDING OF SAND MOLDS

[75] Inventor: Vagn Deve, Shaker Heights, Ohio

[73] Assignee: Combustion Engineering, Inc., Windsor, Conn.

[22] Filed: Dec. 26, 1972

[21] Appl. No.: 318,331

[52] U.S. Cl. .............................................. 198/219
[51] Int. Cl. ........................................... B65g 25/04
[58] Field of Search ................... 198/218, 219, 221

[56] References Cited
UNITED STATES PATENTS
3,221,870   12/1965   Pagay .................... 198/219
3,659,701   5/1972    Taccone ................. 198/221

*Primary Examiner*—Evon C. Blunk
*Assistant Examiner*—Douglas D. Watts
*Attorney, Agent, or Firm*—Robert L. Olson

[57] ABSTRACT

A conveyor for sand molds, wherein the molds are caused to move from the inlet end to the discharge end by forcing a mold onto the inlet end, thereby pushing a mold from the discharge end, once the conveyor is completely filled with molds. The conveyor is constructed of a plurality of stationary, spaced, longitudinal slats. Positioned intermediate some of the stationary slats are a plurality of movable slats. During operation, a lifting force is applied beneath the movable slats, which force is something less than that required to lift the string of molds off the upper surface of the stationary slats. This results in less force being necessary to move the mold string from the inlet end towards the outlet end of the conveyor, thus reducing the possibility of crushing or breaking the sand molds.

3 Claims, 3 Drawing Figures

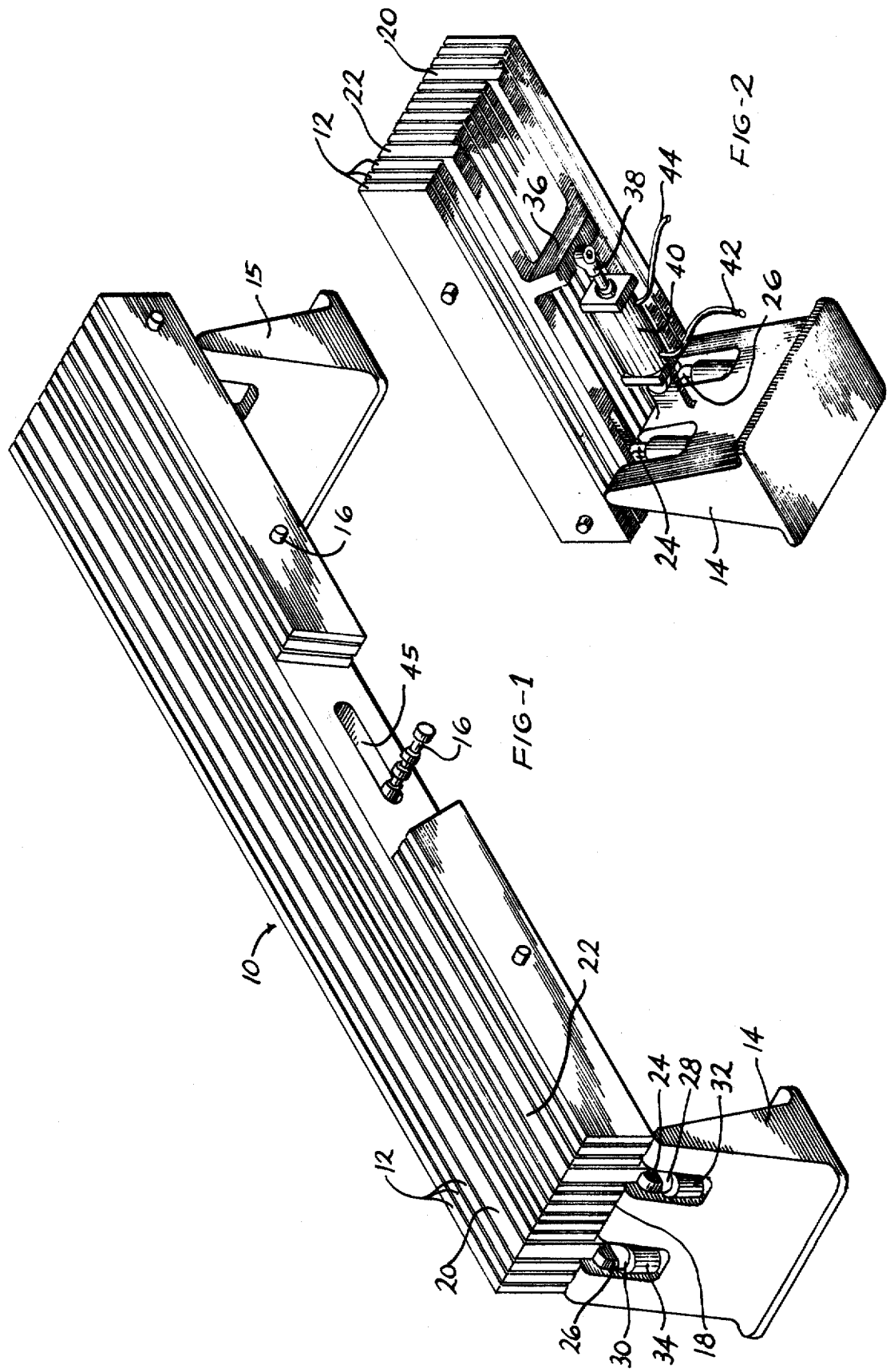

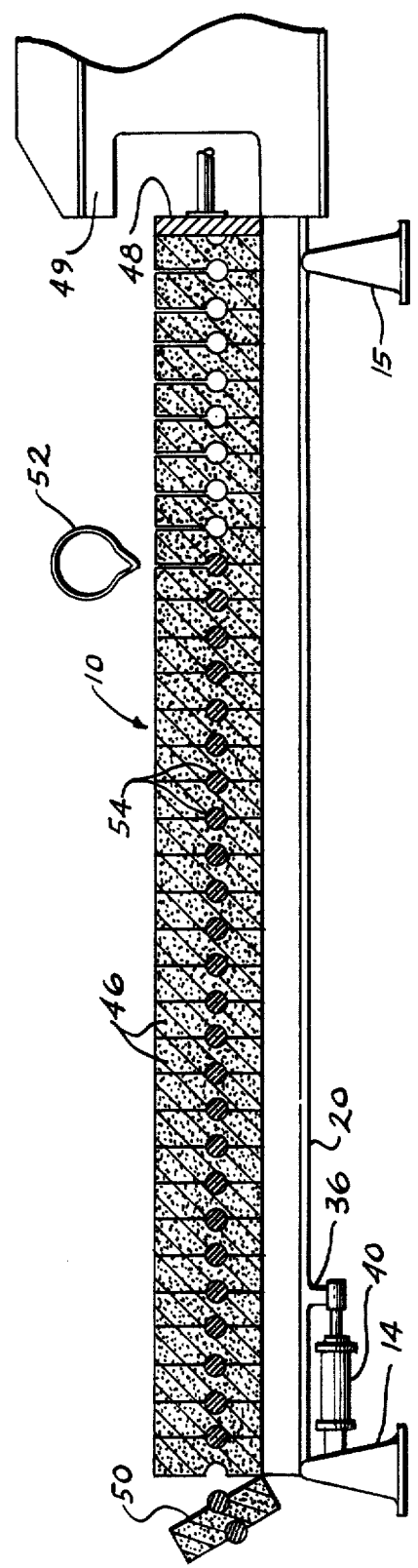

CONVEYOR SYSTEM FOR THE INTERMITTENT FORWARDING OF SAND MOLDS

BACKGROUND OF THE INVENTION

In automated foundry operations, one means of making castings is to form sand molds in a molding machine, and delivering such molds to a pouring station where molten metal is poured into the mold, forming a casting. Each mold has cavity on both of its surfaces, and two successive molds thus form a mold cavity into which molten metal is poured. The castings, after being poured, require time to cool and solidify properly before being exposed to the atmosphere, and thus a long string of successive molds in face to face relationship is required. Since the sand molds are somewhat frangible, care must be taken to prevent breaking or crushing of the molds in the mold string. This problem has become more important in recent times by the use of larger molds, which increases the weight involved, and also increases the size of the castings, thus increasing the required cooling time.

SUMMARY OF THE INVENTION

The present invention provides a conveying system for sand molds, wherein the molds are caused to move from the inlet end to the discharge end by intermittently pushing a mold onto the inlet end from a mold making machine, thus forming a string of face to face molds on the conveyor. The conveyor is constructed of a plurality of stationary, spaced, longitudinal bars. Positioned intermediate some of the stationary bars are a plurality of movable bars. During operation, a predetermined lifting force is applied beneath the movable bars, which force is something less than that required to lift the string of molds off the upper surface of the stationary bars. The movable bars are mounted on rollers, and move along with the mold string, resulting in a reduction of the force required to push the mold string along the conveyor. In addition, a horizontal force is applied to the movable bars, thus further reducing the force required to push the mold string along the conveyor.

BRIEF DESCRIPTION OF THE DRAWING

FIG. 1 is a perspective view of the conveying system with parts broken away;

FIG. 2 is a partial perspective view showing the underside of the conveyor; and

FIG. 3 is a cross-sectional side view of the conveying system shown loaded with molds.

DESCRIPTION OF THE PREFERRED EMBODIMENT

Looking now to FIG. 1, 10 designates a conveying system in its entirety. The conveyor comprises a plurality of spaced, longitudinal, stationary metal bars 12, which are supported on their ends by pedestals 14 and 15. A plurality of strengthening tie rods 16 hold the bars together throughout their length. The bars are fixed at one end to pedestal 14, to maintain their spaced relationship. Positioned intermediate some of the stationary bars 12 are two movable bars 20 and 22. The left ends of these bars rest on rollers 24 and 26. These rollers are secured to the ends of piston rods 28 and 30. The piston rods are attached at their other ends to a pair of pistons (not shown) housed in cylinders 32 and 34, such that hydraulic fluid can be applied to the piston to apply a lifting or descending force to the rollers 24 and 26. The opposite ends of bars 20 and 22 are supported in the same manner.

As best seen in FIG. 2, the movable bars 20 and 22 are tied together by a tiebar 36. Secured to the tiebar 36 is a piston rod 38, which is secured at its other end to a piston contained in cylinder 40. By introducing fluid to opposite sides of the piston through either of lines 42 or 44, the movable bars can be moved to the right or left. Adjacent each location of tie rods 16, the movable members 20 and 22 contain longitudinal slots 45, to allow them to move longitudinally with respect to the stationary bars 12.

FIG. 3 shows the conveyor 10 fully loaded with a string of molds 46. A pusher element 48 intermittently pushes a new mold 46 onto the conveyor from the mold forming machine 49. As a new mold is added to the conveyor at the inlet end, the last one designated 50 is forced off the discharge end. Intermediate the conveyor ends, preferably closer to the inlet end, is a pouring station 52, where molten metal is poured into the mold cavities to form the castings 54.

The operation of the conveyor will now be described. Molds are intermittently pushed onto the inlet end of the conveyor 10 by pusher element 48 from the mold forming machine 49. As these molds pass by pouring station 52, the mold cavities are filled with molten metal. When the conveyor is completely filled with molds, the pusher 48 in sliding a new mold onto the conveyor, will cause the last mold 50 to be pushed off. The hydraulic cylinders 32 and 34, and the similar cylinders at the other end (now shown), are then pressurized with a predetermined lifting force of something less than that required to lift the mold string from the stationary bars 12. The movable bars 20, 22 will thereafter move on the rollers 24, 26 along with the mold string, when pusher 48 slides a new mold onto the cavity. At the outlet end, the last mold 50, along with its then solidified casting, will initially be supported by the ends of movable bars 20 and 22. In addition to the lifting force applied by cylinders 32 and 34, hydraulic fluid is introduced through line 44 to cylinder 40, moving the movable bars to the left, as seen in FIG. 2, further reducing the pushing force required by pusher 48. The friction between movable bars 20, 22 and the mold string will be such that there will be no slippage therebetween. The bars are then lowered below the upper surface of stationary bars 22 by piston-cylinders 32 and 34, and the movable bars are retracted to their initial position by actuation of piston-cylinder 40, causing the last mold 50 to fall off the conveyor.

In this manner, the force required by the pusher 48 in sliding a new mold onto the conveyor is greatly reduced, thus reducing the possibility of crushing or breaking the first few molds on the conveyor closest to the incoming end. If desired, a reduced lifting force can be applied to the movable bars before the conveyor is entirely loaded, or filled with molds. This prevents crushing of the molds while the conveyor is initially being filled. For example, when the conveyor is slightly more than half filled, thus containing 50 percent of its loaded weight (because the molds at the inlet end contain no castings) a lifting force of 80 percent of that required to lift this amount of molds could be applied to the movable bars. Then when the conveyor is entirely filled with molds, the lifting force could be doubled, so that it again is equal to eighty percent of the force required to lift the entire mold string. It should be noted that although two movable bars 20, 22 have been illustrated and described the number and size of such bars or slats will be determined by the size and weight of the molds to be conveyed.

What is claimed is:

1. A method of operating a conveyor for molds wherein molds are intermittently added to one end of the conveyor, and intermittently removed from the other end thereof, said conveyor having a plurality of stationary, parallel, spaced longitudinal members having flat upper surfaces which lie in a common horizontal plane, and a movable longitudinal means positioned in internesting relationship with the stationary members having a flat upper surface which in a first position lies in the same plane as the upper surfaces of the stationary members, and which in a second position lies beneath the plane of the upper surfaces of the stationary members, both the stationary longitudinal members and the movable longitudinal means extending substantially the entire length of the conveyor, comprising the steps of initially loading the conveyor with molds from one end to the other, applying a predetermined lifting force to the bottom of the movable means, which predetermined lifting force is greater than fifty percent of the weight of the load on the conveyor but less than the total weight of the load on the conveyor so that the molds are not lifted from the upper surfaces of the stationary members, sliding a new mold onto one end of the conveyor, while simultaneously maintaining the predetermined lifting force to the bottom of the lifting means, so that the movable means is moved along with the molds, and thereafter applying a force to move the movable means back to its original position, thereby forcing a mold from the other end thereof.

2. The method set forth in claim 1, including the further step of removing the predetermined force from the movable means after it has moved along with the molds, so that its upper surface drops below the plane of the upper surfaces of the stationary members, and thereafter applying said force to move the movable means back to its original position.

3. The method set forth in claim 1, including the step of applying a horizontal force to the movable means in a direction towards said other end of the conveyor, at the same time a new mold is being slid onto said one end of the conveyor.

* * * * *